United States Patent
Gill

(10) Patent No.: US 7,268,982 B2
(45) Date of Patent: Sep. 11, 2007

(54) CURRENT PERPENDICULAR TO PLANE (CPP) GMR STRUCTURE HAVING VANADIUM DOPED, AP COUPLED, MULTI-LAYERED PINNED STRUCTURE

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 512 days.

(21) Appl. No.: 10/970,150

(22) Filed: Oct. 21, 2004

(65) Prior Publication Data
US 2006/0087771 A1    Apr. 27, 2006

(51) Int. Cl.
G11B 5/39    (2006.01)
(52) U.S. Cl. ................... 360/324.11; 257/421
(58) Field of Classification Search ............ None
See application file for complete search history.

(56) References Cited

U.S. PATENT DOCUMENTS

| | | | | |
|---|---|---|---|---|
| 5,134,533 A | 7/1992 | Friedrich et al. | ............ | 360/113 |
| 5,432,661 A | 7/1995 | Shinjo et al. | ............... | 360/113 |
| 5,465,185 A | 11/1995 | Heim et al. | ................. | 360/113 |
| 5,598,308 A | 1/1997 | Dieny et al. | ................ | 360/113 |
| 5,657,191 A | 8/1997 | Yuan | .......................... | 360/113 |
| 5,849,422 A | 12/1998 | Hayashi | ...................... | 428/611 |
| 6,051,309 A | 4/2000 | Fujikata et al. | ............. | 428/332 |
| 6,587,317 B2 | 7/2003 | Gill | ........................ | 360/324.11 |
| 6,683,762 B2 | 1/2004 | Li et al. | ................ | 360/324.11 |
| 6,700,753 B2 | 3/2004 | Singleton et al. | ........ | 360/324.1 |
| 6,784,509 B2 * | 8/2004 | Yuasa et al. | ................ | 257/421 |
| 2001/0013999 A1 | 8/2001 | Koi et al. | ............. | 360/324.11 |
| 2003/0179516 A1 | 9/2003 | Freitag et al. | ......... | 360/324.11 |

FOREIGN PATENT DOCUMENTS

DE    19720197    11/1998

* cited by examiner

Primary Examiner—A. J. Heinz
(74) Attorney, Agent, or Firm—Zilka-Kotab, PC

(57) ABSTRACT

A current perpendicular to plane (CPP) giant magnetoresistive (GMR) sensor having an antiparallel coupled (AP coupled) pinned layer structure wherein the pinning layer have a greatly reduced negative contribution to dR. The pinned layer structure includes a first a first set of magnetic layers such as CoFe and a second set of magnetic layer comprising CoFeV that are antiparallel coupled with the first set of magnetic layers. The magnetic layers of the pinned layer structure alternate between a one of the first set of magnetic layers (eg. CoFe) and one of the second set of magnetic layers (CoFeV). The magnetic layers of the first set contribute to the GMR of the sensor and provide a positive magnetostriction that assists with the pinning of the pinned layer structure. The magnetic layers of the second set contribute pinning, but do not contribute to GMR. The presence of V in the second set of greatly reduces the negative contribution to dR that would otherwise be provided by these pinning layers of the second set by reducing the spin dependent electron scattering through these layers.

25 Claims, 3 Drawing Sheets

CURRENT PERPENDICULAR TO PLANE (CPP) GMR STRUCTURE HAVING VANADIUM DOPED, AP COUPLED, MULTI-LAYERED PINNED STRUCTURE

FIELD OF THE INVENTION

The present invention relates to a current perpendicular to plane (CPP) giant magnetoresistive (GMR) sensor and more particularly to a sensor having improved GMR effect through the use of a multi-layered pinned structure having layers including vanadium (V).

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of a rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Sensors can also be categorized as current in plane (CIP) sensors or as current perpendicular to plane (CPP) sensors. In a CIP sensor, current flows from one side of the sensor to the other side parallel to the planes of the materials making up the sensor. Conversely, in a CPP sensor the sense current flows from the top of the sensor to the bottom of the sensor perpendicular to the plane of the layers of material making up the sensor. In a CPP sensor design, the magnetic shields usually double as electrical leads for supplying a sense current to the sensor. Therefore, in CPP sensor design, the shields/leads contact the top and bottom of the sensor.

The ever increasing demand for data storage density and data rate has increasingly pushed the limits of data storage designs. Recently in efforts to overcome such limits, engineers and scientists have focused on the use of perpendicular recording. In a perpendicular recording system a write pole emits a highly concentrated magnetic field that is directed perpendicular to the surface of the medium (eg. the disk). This field in turn magnetizes a localized portion of the disk in a direction perpendicular to the surface of the disk, thereby creating a bit of data. The resulting flux travels through the disk to a return path having a much larger area than the area in which the bit was recorded. The increased interest in perpendicular recording has lead to an increased interest in current perpendicular to plane (CPP) sensors, which are particularly suited to use in perpendicular recording. This is in part because of the ability of CPP GMR sensors to have smaller gap thicknesses, and therefore smaller bit lengths.

Another effort to increase data capacity and data rate has involved the development of self-pinned sensors. As discussed above, sensors have been constructed as AP pinned sensors having first and second magnetic layers (AP1 and AP2) that are antiparallel coupled across a coupling layer such as Ru. The magnetic layer furthest from the free layer (AP1) is then exchange coupled with a layer of antiferromagnetic material (AFM) layer, which strongly pins the moment of that layer. However, to be useful, such AFM layers must be very thick, even being as thick or thicker than all of the other sensor layer combined. In an effort to decrease gap height, thereby decreasing bit length, sensors have recently been developed that have antiparallel coupled pinned layers that can maintain their pinning with out the need for an AFM layer. Such sensors take advantage of the strong positive magnetostriction of certain material, which when combined with compressive stresses in the sensor, causes a strong magnetic anisotropy in a desired direction perpendicular to the ABS.

Whether a sensor uses a conventional AFM pinned AP coupled pinned layer or a self pinned AP coupled pinned layer, a problem remains in that the outer most magnetic layer (pinning layer or AP1) detracts from the performance of the sensor. The magnetic layer closest to the free layer (pinned layer or AP2) contributes positively, and strongly to the magnetoresistive performance of the GMR sensor, based on spin dependent scattering as discussed above. However, since the pinning layer, that which is furthest from the free layer, is oriented 180 degrees out of phase with the pinned layer, its contribution to GMR is opposite to that of the pinned layer and is, therefore, subtractive. Since the pinning layer is further from the free layer and spacer layer than the pinned layer is, its subtractive GMR effect is less than the positive GMR effect of the pinned layer so there is a net positive GMR effect defined by the orientation of the pinned layer. However, the subtractive GMR effect of the pinning layer can be as great as 30% to 50%.

Another factor affecting sensor performance is the thickness of sensor layers. It has been known that the GMR performance (dR) increases with increasing pinned layer thickness. However, as the thickness of the magnetic layers (pinned layer and pinning layer) increases, the pinning strength drops off significantly, resulting in pinned layer instability. Therefore, while increased pinned layer thickness would be desirable to maximize the dR performance of the sensor, such an increase in thickness is limited by the need to maintain sufficient pinned layer pinning.

Therefore there is a strong felt need for a GMR structure that will minimize the subtractive GMR of the AP1 layer (pinning layer) in an AP pinned layer structure. There is also a need for a sensor structure that can take advantage of the dR performance increase realized by increased pinned layer thickness, while still maintaining pinned layer stability. Such a structure would preferably be useful in a CPP structure since that is this structure is most promising for use in future perpendicular recording systems. Such a structure would also preferably be advantageous for use in a self pinned structure, in order to take advantage of the gap thickness reduction provided by such self pinned structures.

SUMMARY OF THE INVENTION

The present invention provides magnetoresistive sensor for use in a magnetic recording system. The magnetoresistive sensor has a pinned layer structure that includes a first set of magnetic layers (pinned layers) and a second set of magnetic layers (pinning layers) each of which is antiparallel coupled with one or more of the first set of magnetic layers and each of which comprises CoFeV.

The first set of magnetic layers contributes to the GMR of the sensor as well as providing a desired positive magnetostriction, which contributes to pinning of the magnetic moments of the pinned layer structure. The second set of magnetic layers, having magnetic moments that are 180 out of phase with the first set of magnetic layers would provide an undesirable subtractive dR, were it not for the presence of V in these layers. The presence of V in the second set of magnetic layers greatly reduces the spin dependent scattering from these layers, thereby minimizing the negative dR from these layes.

The presence of V, however, advantageously does not reduce the magnetic moment of these layers. In addition, the presence of V in the second set of magnetic layers increases the positive magnetostriction of these layer, which further contributes to pinning.

The multilayer structure of the present invention further promotes pinning by providing additional magnetostatic coupling between the AP coupled magnetic layers of the first and second set of magnetic layers. As discussed in the Background of the Invention, a thicker pinned layer provides improved dR, but also results in decreased pinning. Constructing the pinned layer structure with multiple pinned and pinning layers advantageously provides the dR of a thicker pinned layer structure while also maintainging strong pinning.

The multilayer structure also advantageously increases dR (GMR) of the sensor by providing additional spin dependent scattering interfaces for each of the plurality of magnetic pinned layers (the first set of magnetic layers). This additional dR from multiple AP coupling layers would not be practical without the presence of V in the pinning layers to reduce the negative dR, because the negative dR from the pinning layers would negate any improvement in dR provided by the increased spin dependent scattering from the increased number of interfaces.

These and other advantages and aspects of the present invention can be better appreciated upon reading of the following detailed description taken in conjunction with the Figures in which like reference numerals designate like elements throughout the various Figures.

BRIEF DESCRIPTION OF THE DRAWINGS

For a fuller understanding of the nature and advantages of this invention, as well as the preferred mode of use, reference should be made to the following detailed description read in conjunction with the accompanying drawings.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
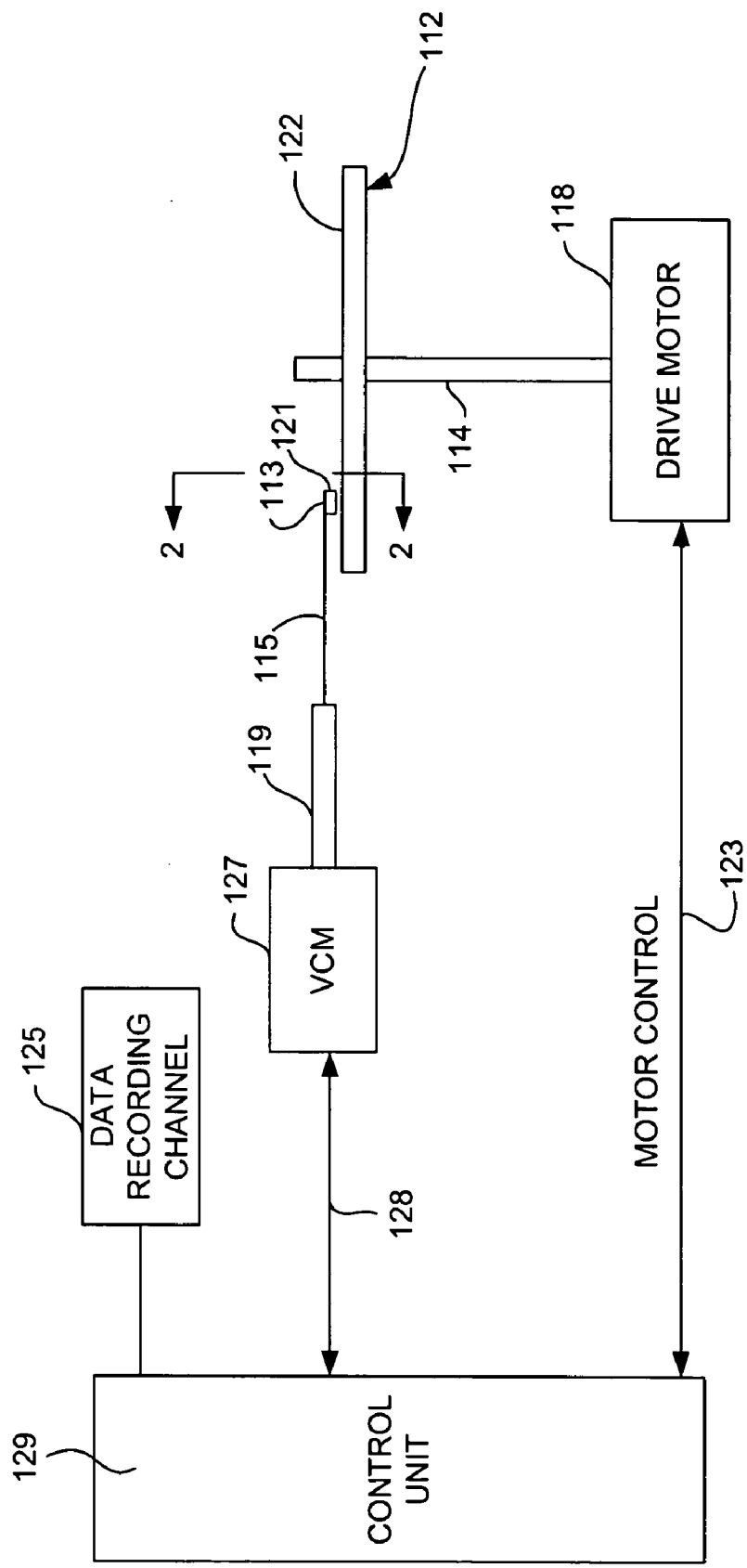
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
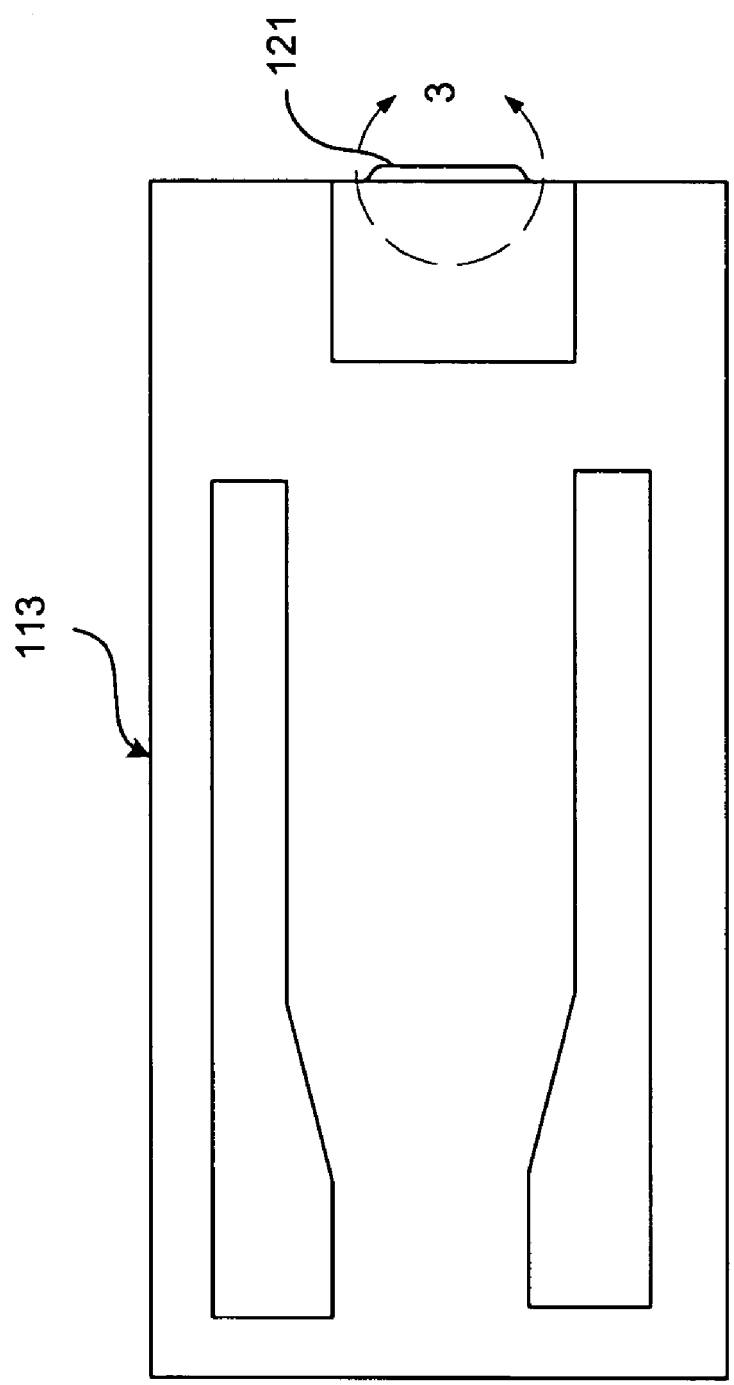
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
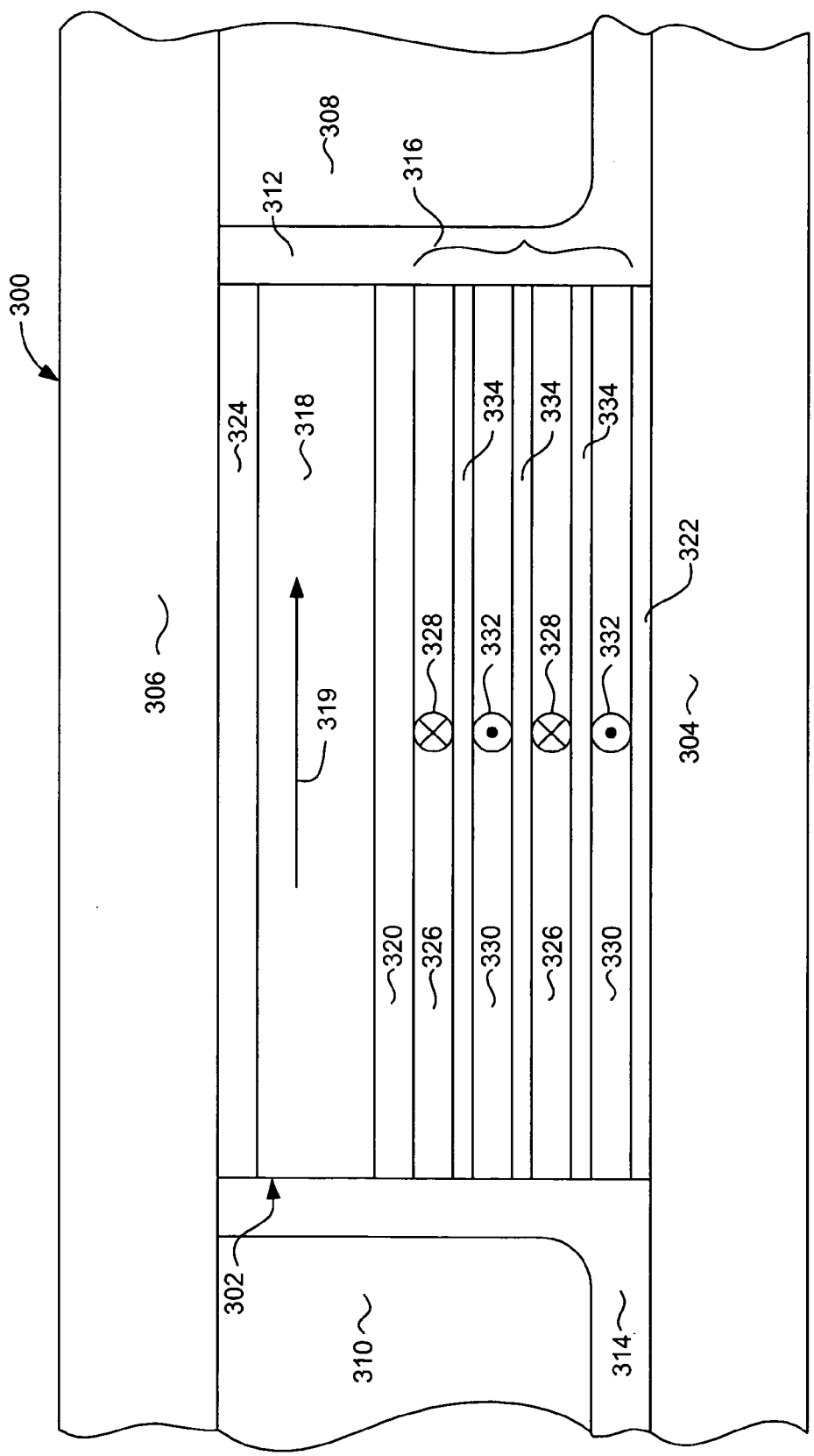
FIG. 3 is an ABS view of a magnetic sensor according to an embodiment of the present invention taken from circle 3 of FIG. 2, shown enlarged and rotated 90 degrees counterclockwise.

With reference now to FIG. 3, the magnetic head 121 (FIG. 2) includes a current perpendicular to plane (CPP) giant magnetoresistive (GMR) sensor 300 (shown in an ABS view) having a sensor stack 302 sandwiched between first and second magnetic shields 304, 306 that serve as electrically conductive leads for conducting a sense current to the sensor stack 302. The first and second leads 304, 306 can be constructed of many electrically conductive, magnetic materials such as for example NiFe.

The sensor 300 also includes first and second hard bias layers 308, 310 that extend laterally outward from the sides of the sensor stack 302 and first and second insulation layers 312, 314 that separate each of the hard bias layers 308, 310 from the sensor stack 302 and at least one of the shields 304 or 308. The hard bias layers 308, 310 are constructed of a hard magnetic material such as, for example, CoPtCr or some other material having a high magnetic coercivity, and are magnetostatically coupled with the free layer 318 to bias the magnetic moment 319 of the free layer 318 in a desired direction parallel with the ABS. The insulation layers 312, 314 are constructed of a non-magnetic, electrically insulating material such as alumina ($Al_2O_3$).

With continued reference to FIG. 3, the sensor stack includes a pinned layer structure 316, a magnetic free layer 318 and an electrically conductive, non-magnetic spacer layer 320 sandwiched between the free layer 318 and the pinned layer structure 316. The free layer can be constructed of many magnetic materials, such as NiFe, CoFe or Co and may be constructed of a plurality of layers of material. Preferably, the free layer 318 has a layer comprising Co, such as Co or CoFe, adjacent to the spacer layer 320. The spacer layer may be constructed of several electrically conductive, non-magnetic materials and is preferably constructed of Cu. It should be pointed out that while the present invention is being described in terms of a GMR sensor, this is for purposes of simplicity and the sensor could be some other type of sensor such as a tunnel junction sensor (TMR). If constructed as a TMR sensor, the spacer layer 320 would be a non-magnetic, dielectric barrier layer, such a $Al_2O_3$.

The sensor stack 302 may also include one or more seed layers 322, which serve to promote a desired grain structure in the later deposited sensor layers. The sensor stack 302 may also include a capping layer 324, formed at the top of the sensor stack 302 to protect the various sensor layer from damage such as from during various subsequent manufacturing processes such as annealing. The capping layer can be for example Ta.

With continued reference to FIG. 3, the pinned layer structure 316 includes a first plurality of magnetic layers 326, each of which has a magnetic moment 328 that is pinned in a first direction perpendicular to the ABS. The pinned layer structure 316 further includes a second plurality of magnetic layers 330, each of which has a magnetic moment 332 that is oriented in a second direction that is 180 degrees out of phase with (antiparallel with) the first direction. As can be seen with reference to FIG. 3, the first and second sets of magnetic layers 326, 330 are arrange in alternating order, such that each of the magnetic layer 326 of the first set is adjacent to at least one magnetic layer 330 of the second set, and conversely, each layer 330 of the second set of layers is adjacent to at least one layer 326 of the first set. Each of the first magnetic layers 326 is antiparallel coupled with at least one of the second set of magnetic layers 330 across an antiparallel coupling layer 334, which can be for example Ru or some other non-magnetic, electrically conductive material such as Cr.

Each of the first magnetic layers 326 is constructed of a magnetic material that contributes strongly to the GMR performance (dR) of the sensor. Such a material can be for example CoFe, preferably having 40 to 60 atomic percent, or about 50 atomic percent Fe. The pinned layer 316 is preferably a self pinned sensor in that it is pinned by magnetic anisotropy provided by a positive magnetostriction of the layers making up the pinned layer 316 in combination with compressive stresses which are inevitably present in GMR sensors. The CoFe material described above having about 50 atomic percent Fe has an advantageously strong positive magnetostriction.

Each of the second set of magnetic layers 330 is constructed of a magnetic material including vanadium (V). The magnetic layers 330 preferably contain about 10 to 15 atomic percent V, and more preferably the magnetic layers 330 are constructed of CoFeV, which may have 5 to 15 atomic percent Fe or about 10 atomic percent Fe and 10 to 15 atomic percent V. Although the pinned layer structure 316 is illustrated as having two of the first magnetic layers 326, and two of the second magnetic layers 330, this is for purposes of illustration only. The pinned layer 316 could have more than two of each of the first and second set of magnetic layers 326, 330.

The above described CoFeV material used in the second set of magnetic layers 330 provides advantageous GMR and magnetostriction properties. The presence of V in the magnetic layers 330 provides several advantages. Most importantly, it has been found that the presence of a relatively small amount of V in a CoFeV alloy reduces spin dependent scattering of electrons flowing through the CoFeV alloy. This effect of V on spin dependent scattering has been demonstrated by I. Mertig in Rep. Prog. Phys. 66, (1999) pages 237-276. This minimizes the subtractive or negative dR (negative GMR effect) of these layers 330. The presence of V also increases the positive magnetostriction of the CoFeV alloy, providing improved pinning strength, especially in a self pinned structure. In addition, the V has very little effect on the magnetic moment of the AP1 layer 324, assuring that the desired AP coupling and resultant free layer stability will not be compromised.

The multilayer pinned layer structure 316 achieves the increased dR benefits of having a thick pinned layer, while also achieving strong pinning. Having a first plurality magnetic layers 326 antiparallel coupled with a second plurality of magnetic layers 330 improves pinning strength by increasing the magnetostatic coupling across the multiple AP coupling layers 334. Furthermore, as discussed above, the increased pinned layer thickness can be achieved without increasing the undesirable subtractive GMR effect from the second set of pinned layers 330.

Pinning of the magnetic moments 328, 332 of the pinned layer 316 is preferably provided by a desired magnetic anisotropy provided by the positive magnetostriction of the magnetic layers 326, 330 in combination with compressive stresses in the sensor 300. In other words, the sensor 300 is self-pinned. The present invention has been described in terms of a self-pinned structure, because the increased pinning strength provided by the novel pinned layer structure 316 is particularly well suited to use in a self pinned structure. This allows the sensor 300 to take advantage of a thinner gap and resultant shorter bit length provided by a self-pinned design. It should be pointed out however, that the present invention could be embodied in a more conventional AFM pinned sensor, in which case an AFM layer (not shown) would be exchange coupled with one of the magnetic layers 326, 330 of the pinned layer structure 316.

Although the present invention has been described in terms of a self pinned CPP GMR sensor having its pinned layer structure 316 at the bottom of the sensor 300, this is for purposes of illustration only. The present invention can be embodied in a sensor having one of many other configurations. For example, the sensor could be either a current perpendicular to plane (CPP) sensor, or a current in plane (CIP) sensor. The sensor could also have an in stack bias layer rather than the laterally disposed bias layers 308, 310. The sensor could also be a top or bottom sensor in that the pinned layer could be at the top as well as at the bottom of the sensor. As previously mentioned, the sensor could also be a tunnel valve, or tunnel junction sensor (TMR) rather than a GMR sensor, and could be AFM pinned rather than self-pinned. Many other possible embodiments of the invention may become apparent to those skilled the art. Therefore, while various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetoresistive sensor having a magnetic pinned layer structure, the magnetic pinned layer structure comprising:
   a first plurality of magnetic layers each of which comprises CoFe;
   a second plurality of magnetic layers each of which comprises CoFeV; and
   a non-magnetic, electrically conductive antiparallel (AP) coupling layer sandwiched between each of the first plurality of magnetic layers and an adjacent layer of the second plurality of magnetic layers.

2. A magnetoresistive sensor as in claim 1 wherein the first and second plurality of magnetic layers are arranged in alternating order.

3. A sensor as in claim 1, wherein each of the second plurality of magnetic layers comprises CoFeV having 10 to 15 atomic percent V.

4. A sensor as in claim 1, wherein each of the second plurality of magnetic layers comprises CoFeV having 10 to 15 atomic percent V, and wherein each of the first plurality of magnetic layers comprises 45 to 55 atomic percent Fe.

5. A sensor as in claim 1, wherein each of the second plurality of magnetic layers comprises CoFeV having 10 to 15 atomic percent V and 10 atomic percent Fe and wherein each of the first plurality of magnetic layers comprises CoFe having 45 to 55 atomic percent Fe.

6. A sensor as in claim 1, wherein each of the second plurality of magnetic layers comprises CoFeV having 10 atomic percent Fe and 10 to 15 atomic percent V, and wherein each of the first plurality of magnetic layers comprises $Co_{50}Fe_{50}$.

7. A sensor as in claim 1, wherein the non-magnetic, electrically conductive AP coupling layer comprises Ru having a thickness of 2 to 8 Angstroms.

8. A magnetic sensor as in claim 1, wherein each of the first plurality of magnetic layers has a thickness of 25 to 35 Angstroms.

9. A magnetic sensor as in claim 1, wherein each of the second plurality of magnetic layers has a thickness of 25 to 35 Angstroms.

10. A magnetic sensor as in claim 1, wherein each of the first and second plurality of magnetic layers has a thickness of 25 to 35 Ansgtroms.

11. A magnetic sensor as in claim 1, wherein the sensor is a current perpendicular to plane sensor further comprising:
   a sensor stack having top and bottom surfaces bounded by first and second lateral sides, the pinned layer structure being incorporated into the sensor stack;
   an electrically conductive first lead in electrical communications with the bottom surface;
   an electrically conductive second lead in electrical communication with the bottom surface;
   a first insulation layer covering the first lateral side and at least a portion of at least one of the first and second leads; and
   a second insulation layer covering the second lateral side and at least a portion of at least one of the first and second leads.

12. A magnetoresistive sensor as in claim 1, wherein the first and second plurality of magnetic layers have magnetic moments that are pinned by magnetic anisotropy provided by positive magnetostriction of the first and second plurality of magnetic layers, and wherein pinning is achieved without exchange coupling with an antiferromagnetic (AFM) material.

13. A magnetic head for use in a magnetic recording system, the magnetic head comprising:
   a slider body having an air bearing surface and terminating at an end;
   a magnetic write element connected with the end of the slider body;
   a magnetoresistive sensor connected with the slider body, the sensor including a magnetic pinned layer structure further comprising:
   a first plurality of magnetic layers each of which comprises CoFe;
   a second plurality of magnetic layers each of which comprises CoFeV; and
   a non-magnetic, electrically conductive antiparallel (AP) coupling layer sandwiched between each of the first plurality of magnetic layers and an adjacent layer of the second magnetic plurality of magnetic layers.

14. A magnetic head as in claim 13, wherein each of the second plurality of magnetic layers comprise CoFeV having 10 to 15 atomic percent V, and wherein each of the first plurality of magnetic layers comprises 45 to 55 atomic percent Fe.

15. A magnetic head as in claim 13, wherein each of the second plurality of magnetic layers comprises CoFeV having 10 to 15 atomic percent V and 10 atomic percent Fe and wherein each of the first plurality of magnetic layers comprises CoFe having 45 to 55 atomic percent Fe.

16. A magnetic head as in claim 13 wherein each of wherein each of the non-magnetic, electrically conductive coupling layers comprises Ru and has a thickness of 2 to 8 Angstroms, and wherein each of the first plurality of magnetic layers is antiparallel coupled with at least one of the second plurality of magnetic layers across one of the non-magnetic, electrically conductive coupling layers.

17. A magnetic head as in claim 13, wherein each of the first plurality of magnetic layers and each of the second plurality of magnetic layers has a thickness of 25 to 35 Angstroms.

18. A magnetic head as in claim 13, wherein each of the first plurality of magnetic layers comprises CoFeV having 10 to 15 atomic percent V.

19. A magnetic data recording system, comprising:
   a magnetic medium;
   an actuator;
   a suspension connected with the actuator;
   a slider connected with the suspension for movement adjacent to a surface of the magnetic medium; and
   a magnetic write element connected with the slider; and
   a magnetoresistive sensor having a pinned layer structure, the pinned layer structure including:
   a first plurality of magnetic layers each of which comprises CoFe;
   a second plurality of magnetic layers each of which comprises CoFeV; and
   a non-magnetic, electrically conductive antiparallel (AP) coupling layer sandwiched between each of the first plurality of magnetic layers and an adjacent layer of the second magnetic plurality of magnetic layers.

20. A magnetic recording system as in claim 19 wherein the magnetoresistive sensor is a current perpendicular to plane (CPP) sensor further comprising:
   a sensor stack having top and bottom surfaces bounded by first and second lateral sides, the pinned layer structure being incorporated into the sensor stack;
   a first electrically conductive lead contacting the top surface;
   a second electrically conductive lead contacting the bottom surface;
   a first electrically insulating layer covering the first lateral side and a portion of at least one of the first and second leads; and
   a second electrically insulating layer covering the second lateral side and a portion of at least one of the first and second leads.

21. A magnetic recording system as in claim 20, wherein each of the second plurality of magnetic layers comprises CoFeV having 10 to 15 atomic percent V.

22. A magnetic recording system as in claim 20 wherein each of the second magnetic layers comprises CoFeV having 10 atomic percent Fe and 10 to 15 atomic percent V.

23. A magnetoresistive sensor having a pinned layer structure comprising:
   a plurality of pinned magnetic layers; and
   a plurality of pinning magnetic layers each of which is antiparallel coupled (AP coupled) with at least one of the plurality of pinned layers, the pinning layers comprising CoFeV.

24. A magnetoresistive sensor as in claim 23, wherein the pinning layers comprise CoFeV having 10 to 15 percent V.

25. A magnetoresistive sensor as in claim 23, wherein the pinning layers comprise CoFeV having 10 to 15 atomic percent V, and the pinned layer comprise CoFe having 45 to 55 atomic percent Fe.

* * * * *